UNITED STATES PATENT OFFICE.

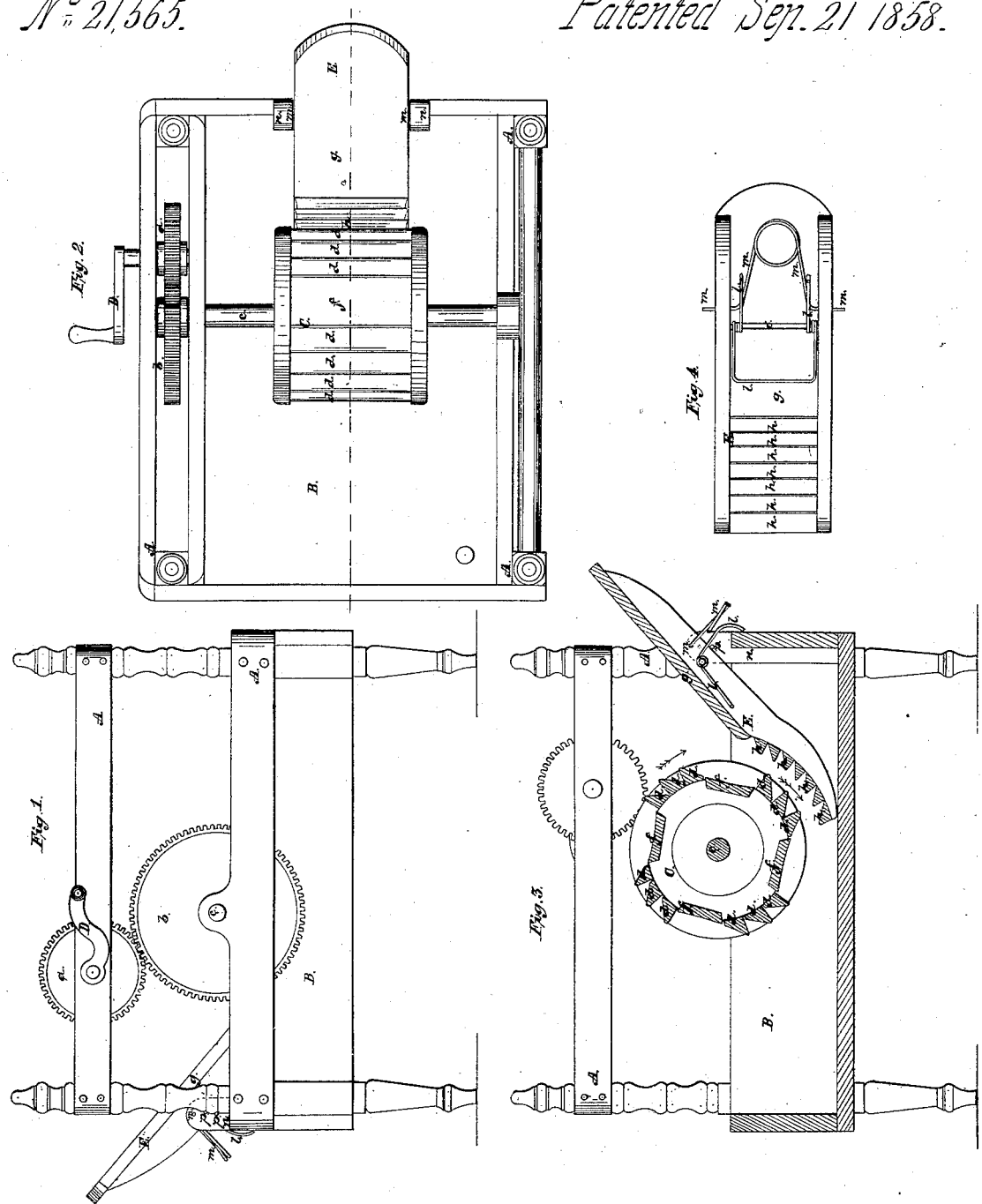

HENRY R. JUNE, OF MILLPORT, NEW YORK.

WASHING-MACHINE.

Specification of Letters Patent No. 21,565, dated September 21, 1858.

*To all whom it may concern:*

Be it known that I, HENRY R. JUNE, of Millport, in the county of Chemung and State of New York, have invented a new and Improved Washing-Machine; and I do hereby declare that the following is a full and exact description thereof, reference being had to the accompanying drawings, making part of this specification, Figure 1 being a side elevation of the machine; Fig. 2, a plan thereof; Fig. 3, a longitudinal vertical section thereof; Fig. 4, plan of the bottom of a part detached.

Like letters designate corresponding parts in all the figures.

Within a frame A, of any convenient construction, I locate a tub or box B, of suitable size and form, for the reception of the water for washing. A cylindrical, revolving rubber C, is mounted in this box, in the proper position for action; to which a revolving motion is given, in the direction indicated by the arrow in Fig. 3, by means of a winch D, and cog-wheels $a$, $b$, substantially as represented. The periphery of the rubber is composed of sets of slats $d$, $d$, $d$, inclined or chamfered on their rubbing sides, as shown, together with intermediate retreating boards $f$, $f$, which present hollows, or recesses, alternating with said slats.

In front and beneath the revolving rubber, is situated a stationary rubber, or concave, E, inclined in position, and pivoted between standards $n$, $n$, of the frame. There are different holes $p$, $p$, in the standards, for the reception of the pivot $m$, on which this rubber vibrates, so as to adjust the inclination of the rubber to suit different kinds and conditions of the clothes; and in order to facilitate the adjustment, the pivot $m$, is made of an elastic rod, coiled so as to form a spring in the middle, as seen in Fig. 4; so that its elasticity keeps the ends securely in the bearing holes $p$, $p$; and when it is desired to change positions, the spring is compressed, and the pivots removed at once from their bearings. The upper part of this stationary rubber is covered with a plane board $g$, on which the clothes are placed and retained, before allowing them to pass between the rubbers. The concave or rubber portion, is composed of slats $h$, $h$, arranged similarly to the slats $d$, $d$, $d$, on the revolving rubber, as represented in Fig. 3. A spring $l$, beneath the rubber keeps it pressed upward toward the revolving rubber; but the pressure is taken away or varied, at pleasure, by the hand of the operator bearing or lifting at the upper end of the rubber.

The arrangement of the sets of projecting slats $d$, $d$, $d$, alternating with the receding or depressed boards $f$, $f$, is found to be very effective in connection with the elastic stationary rubber E, by the alternate compressing and relieving from pressure of the clothes, and the consequent alternation of their saturation with, and nearly depriving of, water. The various degrees of pressure which are so readily given to the stationary rubber, also, finely adapts the machine to the most delicate as well as the hardest rubbing.

What I claim as my invention and desire to secure by Letters Patent, is—

1. The combination of the revolving rubber C, having alternate slats $d$, $d$, $d$, and receding boards $f$, $f$, as described, with the rubber E, constructed and operating in the manner specified.

2. I also claim the elastic pivot-rod $m$, operating in the manner and for the purpose herein set forth.

HENRY R. JUNE.

Witnesses:
 A. B. WHITE,
 B. KELTON.